US009457860B2

(12) United States Patent
Beaudry et al.

(10) Patent No.: US 9,457,860 B2
(45) Date of Patent: Oct. 4, 2016

(54) ELECTRIC MOTORCYCLES HAVING CRASH BARS AND METHODS FOR MODIFYING AN ELECTRIC MOTORCYCLE TO INCLUDE CRASH BARS

(71) Applicant: Global Enforcement Motors, Inc., Hayden, ID (US)

(72) Inventors: Drake Beaudry, Eagle, ID (US); Steve Beaudry, Hayden, ID (US)

(73) Assignee: Global Enforcement Motors, Inc., Hayden, ID (US)

( * ) Notice: Subject to any disclaimer, the term of this patent is extended or adjusted under 35 U.S.C. 154(b) by 0 days.

(21) Appl. No.: 14/936,498

(22) Filed: Nov. 9, 2015

(65) Prior Publication Data
US 2016/0083036 A1  Mar. 24, 2016

Related U.S. Application Data

(63) Continuation of application No. 14/254,825, filed on Apr. 16, 2014, now Pat. No. 9,180,924.

(60) Provisional application No. 61/812,587, filed on Apr. 16, 2013.

(51) Int. Cl.
*B62J 27/00* (2006.01)
*B62K 11/00* (2006.01)

(52) U.S. Cl.
CPC .............. *B62J 27/00* (2013.01); *B62K 11/00* (2013.01); *B62K 2204/00* (2013.01)

(58) Field of Classification Search
CPC ....................................................... B62J 27/00
See application file for complete search history.

(56) References Cited

U.S. PATENT DOCUMENTS

| | | | | |
|---|---|---|---|---|
| D270,527 S | * | 9/1983 | O'Rourke | D12/114 |
| 6,758,484 B1 | * | 7/2004 | Rice | B62J 27/00 |
| | | | | 180/219 |
| 6,910,704 B1 | * | 6/2005 | Celiceo | B62J 27/00 |
| | | | | 280/304.4 |
| 6,969,083 B2 | * | 11/2005 | Egan | B62J 25/00 |
| | | | | 180/219 |
| D513,719 S | * | 1/2006 | Egan | D12/126 |
| 6,981,713 B2 | * | 1/2006 | Lindby | B62J 25/00 |
| | | | | 280/291 |
| 6,994,150 B1 | * | 2/2006 | Kline | B62J 27/00 |
| | | | | 123/196 AB |
| 7,083,181 B2 | * | 8/2006 | Lindby | B62J 25/00 |
| | | | | 280/291 |
| 7,108,273 B2 | * | 9/2006 | Hunwardsen | B62J 25/00 |
| | | | | 180/219 |

(Continued)

OTHER PUBLICATIONS

2014 Zero DS Police motorcycle brochure printed Apr. 16, 2014; www.zeromotorcycles.co.za/zerodsp.htm; 2 pages.

*Primary Examiner* — Kevin Hurley
(74) *Attorney, Agent, or Firm* — Wells St. John P.S.

(57) ABSTRACT

An electric motorcycles having crash bars is provided, the motorcycle comprising an electric motorcycle frame supported by a front wheel and a rear wheel, the frame further providing support for a seat to support a rider, a front portion of the frame configured to engage forks that engage the front wheel, the front portion extending from a rocker portion of the frame upward to engage the forks, and opposing crash bars coupled to the frame of the electric motorcycle, the crash bars being coupled to opposing portions of the rocker portion of the frame. A process for modifying an electric motorcycle to include crash bars is provided, the process comprising providing an exposed electric motorcycle frame, the frame being exposed about a rocker portion and the extension between the rocker portion and the forks, coupling a support member across the extension, and coupling a lower portion of the crash bars to the rocker portion and to the support member.

4 Claims, 7 Drawing Sheets

(56) References Cited

U.S. PATENT DOCUMENTS

| | | | | |
|---|---|---|---|---|
| 7,159,887 B2* | 1/2007 | Barnes | B62K 11/04 | |
| | | | 180/219 | |
| 7,475,897 B2* | 1/2009 | Wang | B62J 23/00 | |
| | | | 180/219 | |
| 8,333,398 B2* | 12/2012 | Oved | B62H 1/12 | |
| | | | 280/304.3 | |
| 9,180,924 B1* | 11/2015 | Beaudry | B62J 27/00 | |
| 2008/0093146 A1* | 4/2008 | Kobayashi | B62J 27/00 | |
| | | | 180/219 | |
| 2010/0307853 A1* | 12/2010 | Song | B62K 11/00 | |
| | | | 180/227 | |
| 2013/0292198 A1* | 11/2013 | Matsuda | B62K 11/04 | |
| | | | 180/220 | |
| 2014/0062073 A1* | 3/2014 | De Castro | B62J 27/00 | |
| | | | 280/756 | |
| 2014/0367183 A1* | 12/2014 | Matsuda | B62K 11/04 | |
| | | | 180/220 | |

* cited by examiner

ELECTRIC MOTORCYCLES HAVING CRASH BARS AND METHODS FOR MODIFYING AN ELECTRIC MOTORCYCLE TO INCLUDE CRASH BARS

CROSS REFERENCE TO RELATED APPLICATION

This application is a continuation of U.S. patent application Ser. No. 14/254,825 which was filed on Apr. 16, 2014, entitled "Electric Motorcycles Having Crash Bars and Methods for Modifying an Electric Motorcycle to Include Crash Bars", which claims priority to U.S. Provisional Patent Application Ser. No. 61/812,587 which was filed on Apr. 16, 2013, the entirety of which is incorporated by reference herein.

TECHNICAL FIELD

The present disclosure relates to electric motorcycles, and in particular embodiments, electric motorcycles that include crash bars, as well as processes for modifying electric motorcycles to include crash bars. In particular embodiments, the present disclosure provides police motorcycles as well that include crash bars.

BACKGROUND

Recently it has become important to utilize electric vehicles in many forms as transportation under the belief that the use of electric vehicles is an environmentally conscious decision. As part of this wave of electric vehicles, the electric motorcycle has been developed. The electric motorcycle presents unique technical challenges to utilize the electric motorcycle as motorcyles have been utilized in all facets of transportation. As an example, motorcycles in the past have been utilized as police motorcycles, enabling singular officers to manipulate traffic and transport singular officers between points quickly and efficiently. However, electric motorcycles are designed with lighter frames and components, making the use of traditional components on electric motorcycles in some circumstances unfeasible. The present disclosure provides crash bars for these electric motorcycles that have heretofore not been utilized.

SUMMARY OF THE DISCLOSURE

Electric motorcycles having crash bars are provided with the electric motorcycles including an electric motorcycle frame supported by a front wheel and a rear wheel. The frame can further provide support for a seat to support a rider, a front portion of the frame being configured to engage forks that engage the front wheel. The front portion can also extend from a rocker portion of the frame upward to engage the forks. The electric motorcycle with crash bars can include opposing crash bars coupled to the frame of the electric motorcycle, with the crash bars being coupled to opposing portions of the rocker portion of the frame.

Processes for modifying electric motorcycles are also provided, and these processes can include providing crash bars to the electric motorcycles. The processes can include providing an exposed electric motorcycle frame, with the frame being exposed about a rocker portion and the extension between the rocker portion and the forks. The process can go on to provide coupling a support member across the extension between the rocker portion and the forks. The process can also include coupling a lower portion of the crash bars to the rocker portion, and to the support members.

The present crash bar design can prevent frame collapse and/or battery damage during collision and/or bike accidents.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
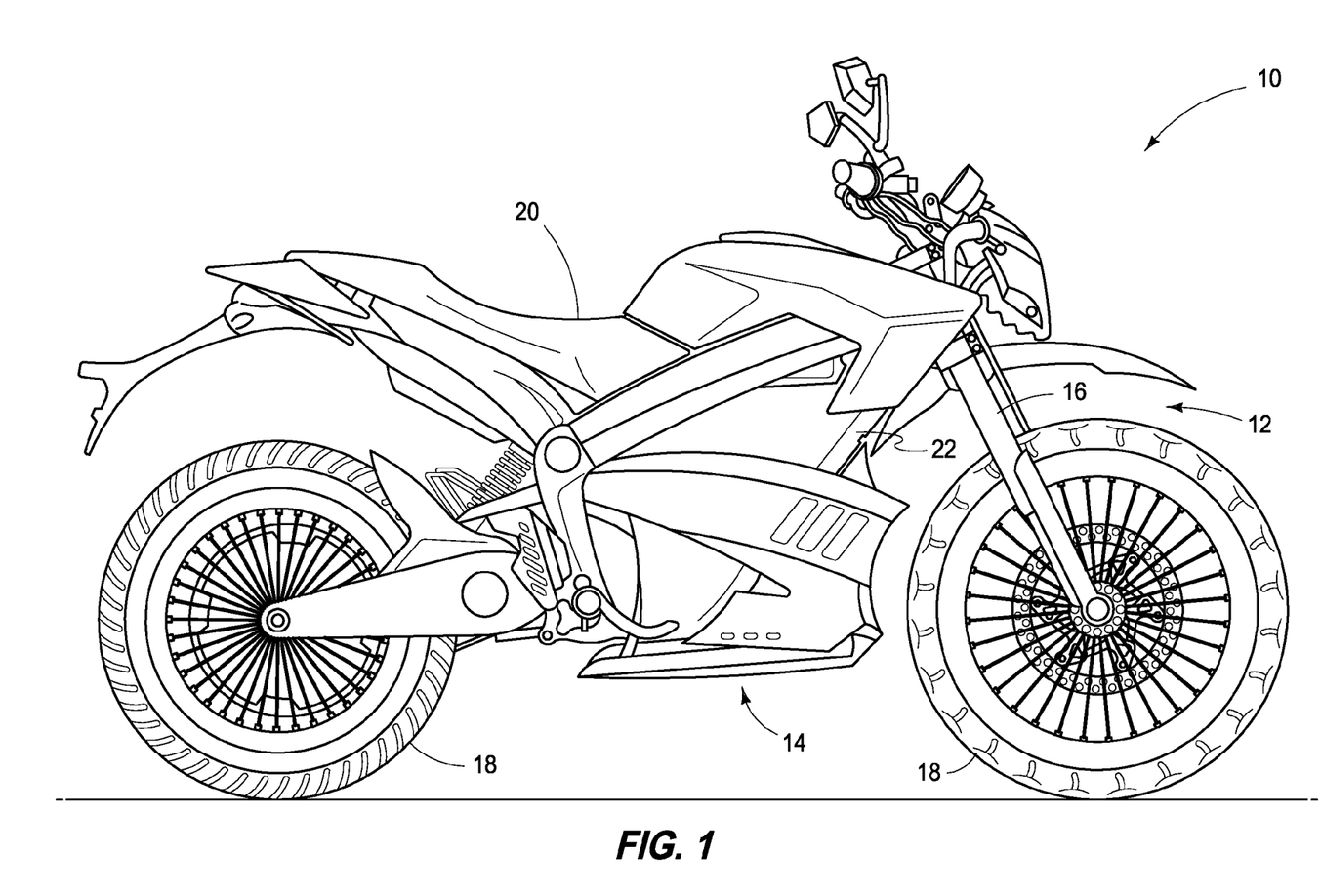
FIG. 1 is an electric motorcycle prior to modification with crash bars.

Electric motorcycles and processes of modifying electric motorcycles to include crash bars will be described with reference to FIGS. 1-7. Referring first to FIG. 1, a classic electric motorcycle 10 is shown that includes front portion 12. Front portion 12 includes rocker portion 14 extending to couple with forks 16. As can be seen, electric motorcycle 10 can be supported by wheels 18 and provide a seat 20 for a rider above the frame that includes rocker portion 14. Rocker portion 14 can extend via frame portion 22 to couple with forks 16 of motorcycle 10.

Figure 2:
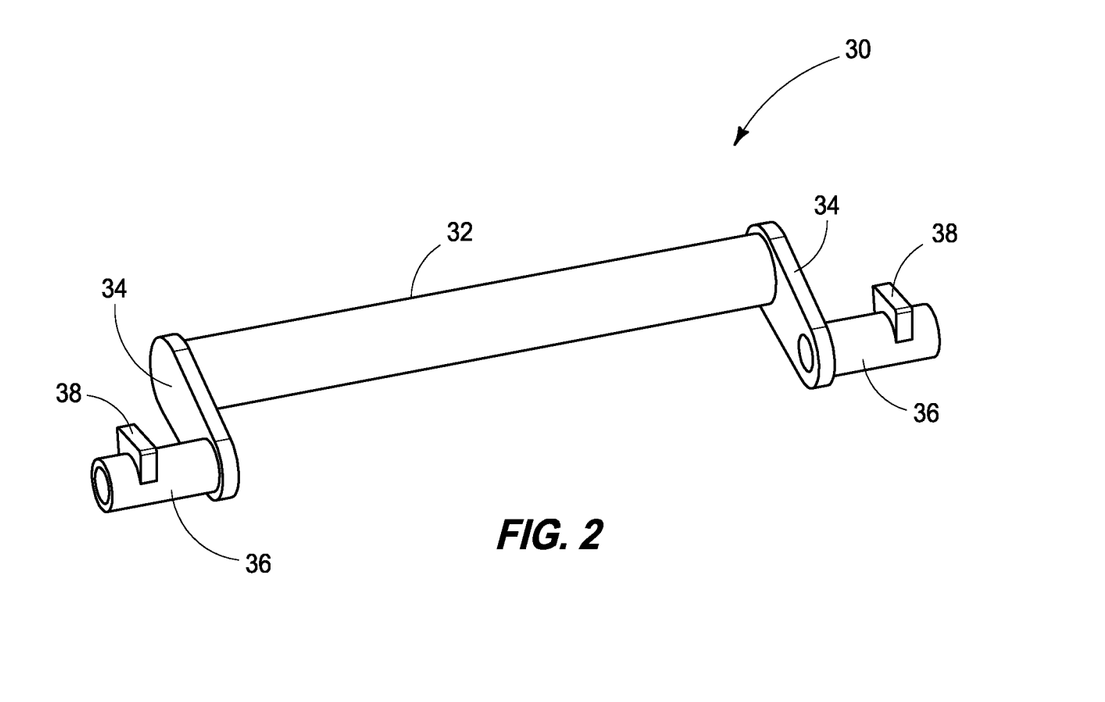
FIG. 2 is a component of the crash bar assembly according to an embodiment of the disclosure.

Referring next to FIG. 2, a support member 30 is shown that includes an elongate member 32. Elongate member 32 can be a tubular member and as with all components of the crash bar assembly, can be constructed of plain carbon steel, for example. Extending normally from the ends of elongate member 32 can be members 34. Members 34 can be configured as plate members rounded on either edge, and can extend from a substantially larger portion to a smaller portion. At the ends of these smaller portions can extend fit members 36. Fit members 36 can be hollowed members that extend normally from plate members 34 and are configured to engage a portion of crash bars to be coupled therewith. Item 38 can be utilized to brace or couple with portion of the upper frame member 32 of motorcycle 10, for example. The wall thickness of these members can be approximately 2.5 mm and the length of plate member 34 from connection point to connection point can be approximately 43.4 mm. The width of support member 32 can be approximately 218 mm, while the overall width of support member 30 can be 312 mm. The overall length of plate members 34 can be 72 mm as well.

Figure 3A:
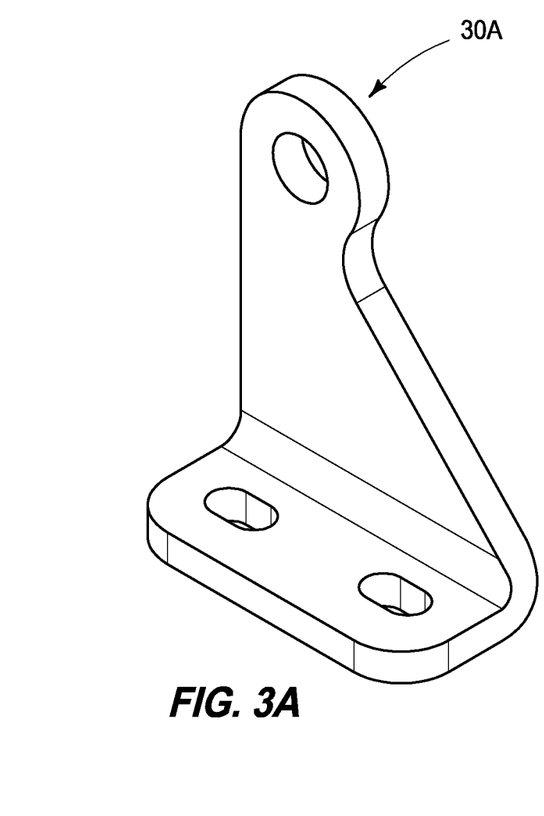
FIGS. 3A and 3B are components of the crash bar assembly according to an embodiment of the disclosure.
Figure 3B:
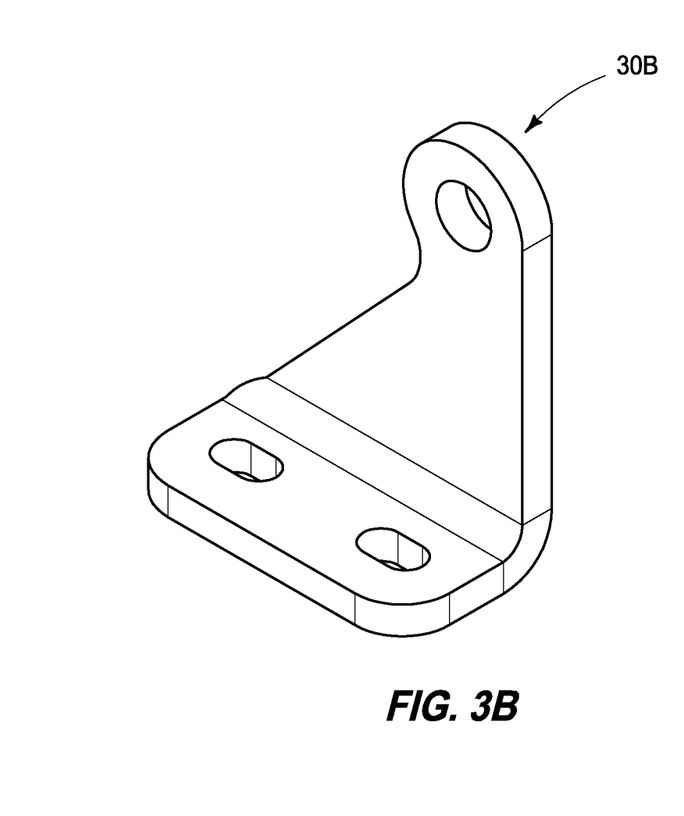

Referring next to FIGS. 3A and 3B, brackets 30A and 30B for attaching the support member 30 to frame 22 of motorcycle 10 are disclosed. Again, these brackets can be constructed of carbon steel and have a thickness of approximately 6 mm. As can be seen, these brackets are mirror images of one another and are to be placed at opposing edges of frame portion 22.

Figure 4:
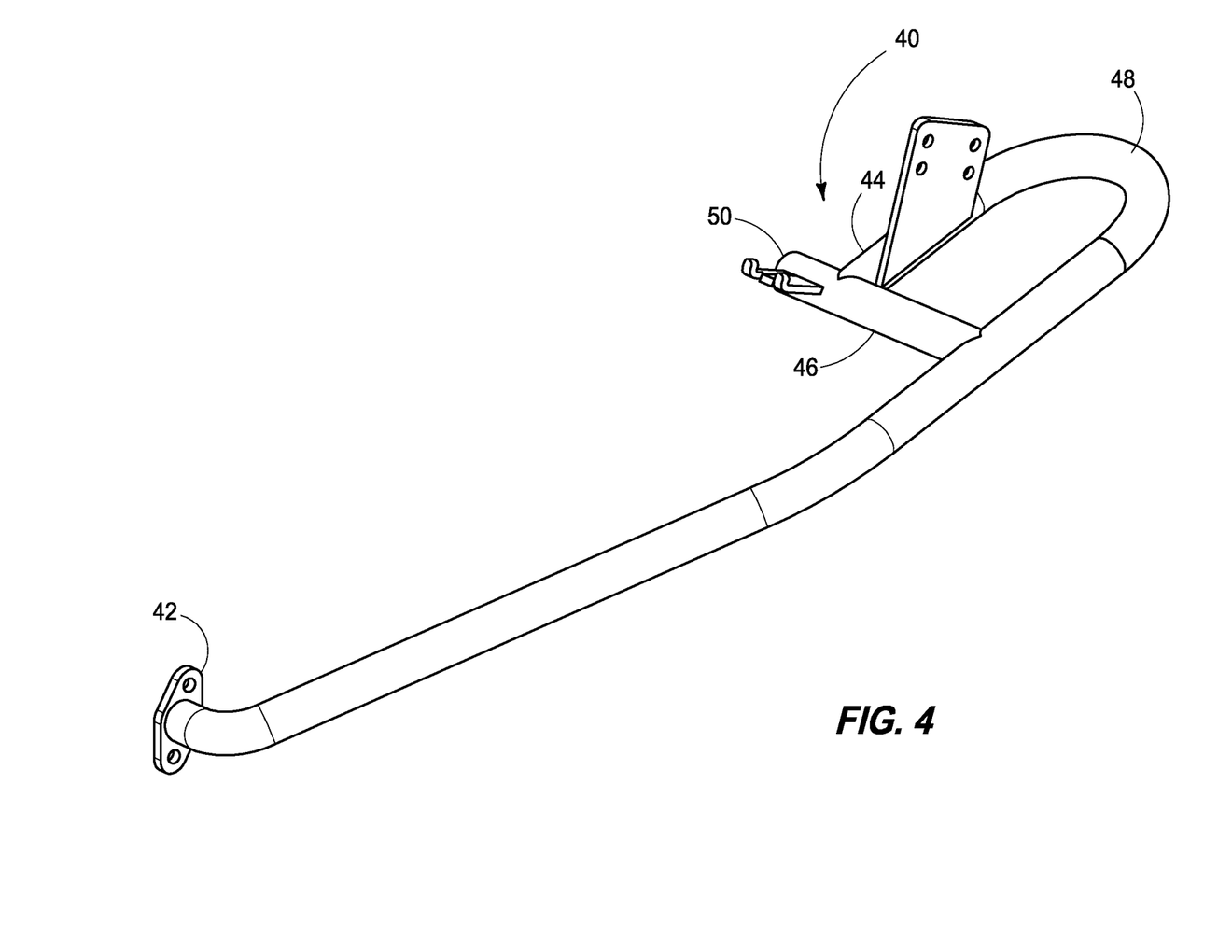
FIG. 4 is a component of the crash bar assembly according to an embodiment of the disclosure.

Referring next to FIG. 4, a crash bar 40 is disclosed that includes a tubular member extending from a coupling end 42 to an opposing end 44. Extending between opposing end 44 and end 42 of the tubular member is a straight portion 46. This straight portion 46 can tie end 44 to the tubular portion of crash bar 40. In accordance with example implementations, the member can form a loop that includes curved portion 48 and straight portion 46. At the terminus of straight portion 46, terminus 50 can be configured to couple with slip fit portion 36 of support member 30. Again, this component can be constructed of carbon steel, and may have a wall thickness of 2.5 mm and the plate brackets may have a thickness of approximately 6 mm.

Figure 5:
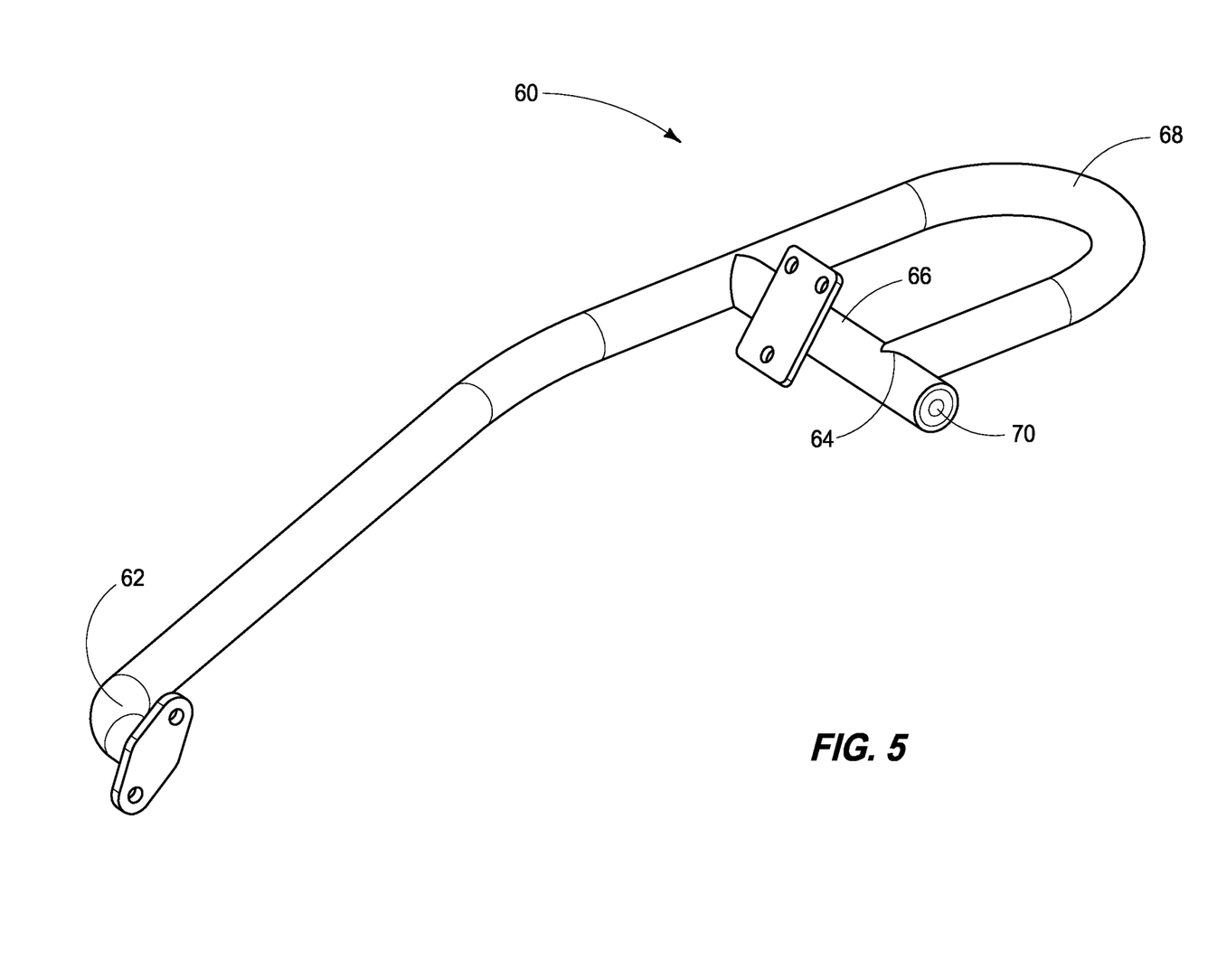
FIG. 5 is a component of the crash bar assembly according to an embodiment of the disclosure.

Referring next to FIG. 5, a crash bar 60 is shown to be placed on the left portion of the motorcycle, and can be considered a mirror image of crash bar 40 shown in FIG. 4. As can be seen, the elongate member of the crash bar extends from terminus 62 and loops through curved portion 68 to terminate in end 64. Extending between end 64 and the other portion of the elongate member is straight portion 66. Straight portion 66 can have a terminus 70 which is configured to couple with slip fit portion 36 of support member 30. Terminus 70 can be threaded to receive a bolt or screw. Again, this can be constructed of the same materials as the crash bar of FIG. 4.

A bolt or screw can be extended through planar portion 34, then through the single opening in 30A or B depending on the side being installed, and then into terminus 70, coupling components 30, 30A, and individual crash bars to form an assembly.

Figure 6:
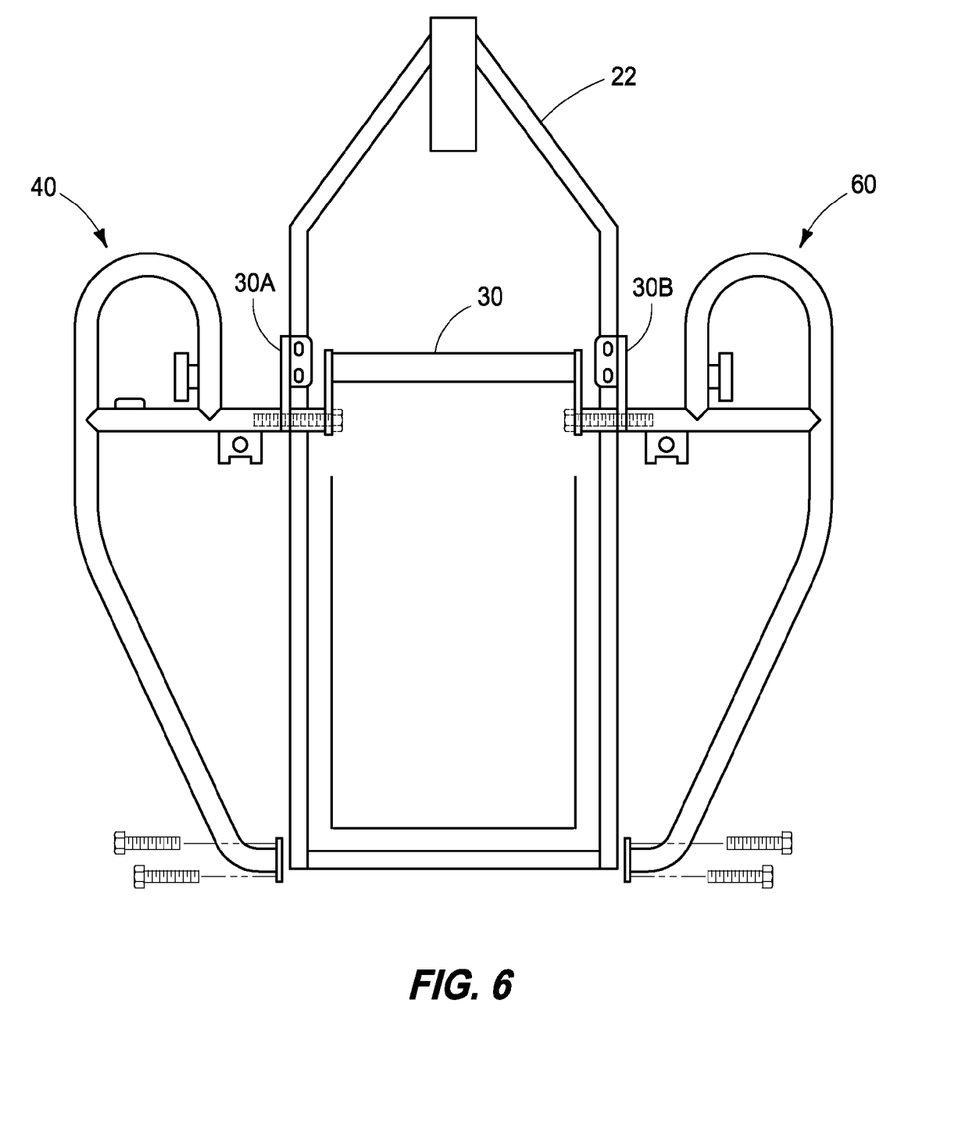
FIG. 6 is a shell crash bar assembly according to an embodiment of the disclosure.

Referring next to FIG. 6 a shell crash bar assembly is shown aligning components 40 and 60 about component 30 with component 30 being coupled to frame portion 22. These components can be coupled to one another with fasteners such as screws and/or bolts for example.

Figure 7:
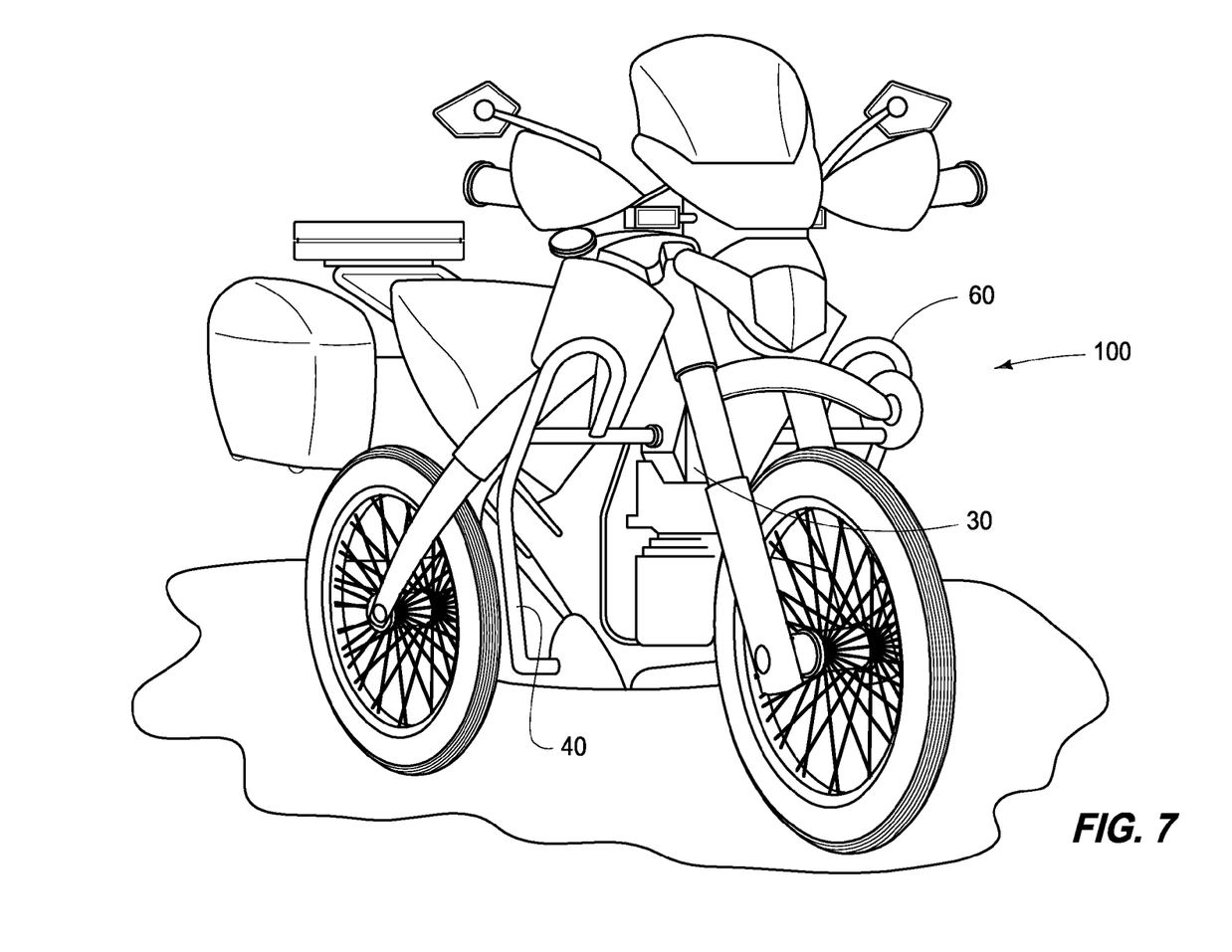
FIG. 7 is a depiction of a modified electric motorcycle including crash bars according to an embodiment of the present disclosure.

Finally, referring to FIG. 7, in a completed form, the crash bars are shown attached to a police motorcycle. In accordance with example implementations, the police motorcycle can include crash bars 40 and 60 coupled to the frame and supported by support member 30. An example of a completed motorcycle is shown in the 2014 Zero DS Police motorcycle brochure filed herewith, the entirety of which is hereby incorporated by reference herein.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An electric motorcycle having crash bars, the motorcycle comprising:
   an electric motorcycle frame supported by a front wheel and a rear wheel, the frame further providing support for a seat to support a rider, a front portion of the frame configured to engage forks that engage the front wheel, the front portion extending from a rocker portion of the frame upward to engage the forks;
   opposing crash bars coupled to the frame of the electric motorcycle, the crash bars being coupled to opposing portions of the rocker portion of the frame;
   a pair of brackets coupled laterally to the front portion of the frame; and
   a support member extending across the front portion and between the pair of brackets, the support member being coupled at opposing ends to individual ones of the crash bars and brackets.

2. The electric motorcycle of claim 1 wherein each individual crash bar extends to form a loop, the loop comprising a curved portion and a straight portion, the straight portion aligning with the support member.

3. The electric motorcycle of claim 1 wherein the support member comprises an elongate member extending between a pair of plate members.

4. The electric motorcycle of claim 3 wherein the support member further comprises a pair of fit members each extending from individual ones of the plate members, the fit members configured to couple with the bracket and/or crash bar.

* * * * *